United States Patent [19]
Doany

[11] Patent Number: 5,863,125
[45] Date of Patent: Jan. 26, 1999

[54] HIGH EFFICIENCY TWO-SLM PROJECTOR EMPLOYING TOTAL-INTERNAL-REFLECTION PRISM

[75] Inventor: Fuad Elias Doany, Katonah, N.Y.

[73] Assignee: International Business Machines Corporation, Armonk, N.Y.

[21] Appl. No.: 16,789

[22] Filed: Jan. 30, 1998

[51] Int. Cl.$^6$ .................................................. G03B 21/14
[52] U.S. Cl. ............................... 353/84; 353/31; 353/20; 348/743
[58] Field of Search ................................... 353/20, 31, 34, 353/37, 84; 349/9, 97, 106, 108, 109; 359/887, 891; 348/742, 743

[56] References Cited

U.S. PATENT DOCUMENTS

| | | | |
|---|---|---|---|
| 3,597,069 | 8/1971 | Heinonen | 353/84 |
| 5,463,433 | 10/1995 | Koo | 353/84 |
| 5,517,340 | 5/1996 | Doany et al. | 359/41 |
| 5,612,753 | 3/1997 | Poradish | 348/743 |
| 5,668,572 | 9/1997 | Meyer et al. | 348/743 |
| 5,777,694 | 7/1998 | Poradish | 348/743 |

*Primary Examiner*—William Dowling
*Attorney, Agent, or Firm*—Scully, Scott, Murphy & Presser; Daniel P. Morris

[57] ABSTRACT

A display is disclosed operating in a field-sequential color mode having at least two light valves which are simultaneously illuminated with different color beams having the same polarization provided from a color wheel. The light valves provide an image forming light to a projection lens for projecting the image forming light onto a screen. The wheel has front and back surfaces which are displaced from each other and have segments of different colors for separating a polarized light into the simultaneous different color beams when the different colors of the front and back color segments overlap. The two beams from the front and back surfaces are parallel to each other when the front and back surfaces are parallel. Alternatively, when the front and back surfaces meet to form a wedge, the two beams have different directions. The front and back color segments are offset relative to each other and each has clear segments so that one colored beam is provided to one of the light valves. The front and back clear segments are also offset relative to each other. The wheel is rotated for sequentially illuminating the light valves with different colors simultaneously.

28 Claims, 8 Drawing Sheets

HIGH EFFICIENCY TWO-SLM PROJECTOR EMPLOYING TOTAL-INTERNAL-REFLECTION PRISM

BACKGROUND OF THE INVENTION

1. Field of the Invention

The present invention is directed to a projection display for sequentially illuminating and imaging at least two light valves, and more particularly, to projection display employing a total-internal-reflection prism and a rotating wheel having two surfaces for simultaneously illuminating both light valves with different colors.

2. Discussion of the Prior Art

Typically, conventional projection displays have three light valves or spatial light modulators (SLMs). To reduce cost and complexity of projection displays, field-sequential color mode is used, where only one SLM is used to produce a full color image, instead of three SLMs, one for each of the primary colors, red (R), green (G), and blue (B).

In projection displays using the field-sequential color mode method, a full color image is produced using a single SLM by time-averaging the three primary colors. The single SLM is illuminated sequentially by the three RGB colors, one color at a time. For example, the single SLM is first configured with the red image data and exposed to red light for one-third of a frame time. Next, the single SLM is configured with the green image data and exposed to green light for the second third of the frame time. Finally, the single SLM is configured with the blue image data and exposed to blue light for the final third of the frame time. The full color image is the time average of three individual color sub-frames. This sequential illumination of the single SLM requires the SLM to operate at three times the illumination or update rate of each color. For example, if the full color frame is renewed at 60 Hz, then the SLM must operate at 180 Hz.

Although using only a single SLM, instead of three SLMS, reduces cost and complexity of displays, such conventional single SLM displays have several disadvantages. First, the SLM must operate at higher frequencies, typically three times the normal video frame rate. Second, conventional single SLM displays are relatively inefficient since only one color at a time is used, thus discarding ⅔ of the light from a white light source. The efficiency is actually worse than ⅓, since part of the frame time must be reserved for electronic data addressing and for a period of time required for SLM stabilization, referred to as dead-time. For example, because the response time of the liquid crystal (LC) material available for each color of the single SLM displays can be many milliseconds, this dead-time can become half or more than half the frame time which is 1/180 seconds (or 5.6 msec), for example.

Figure 1:
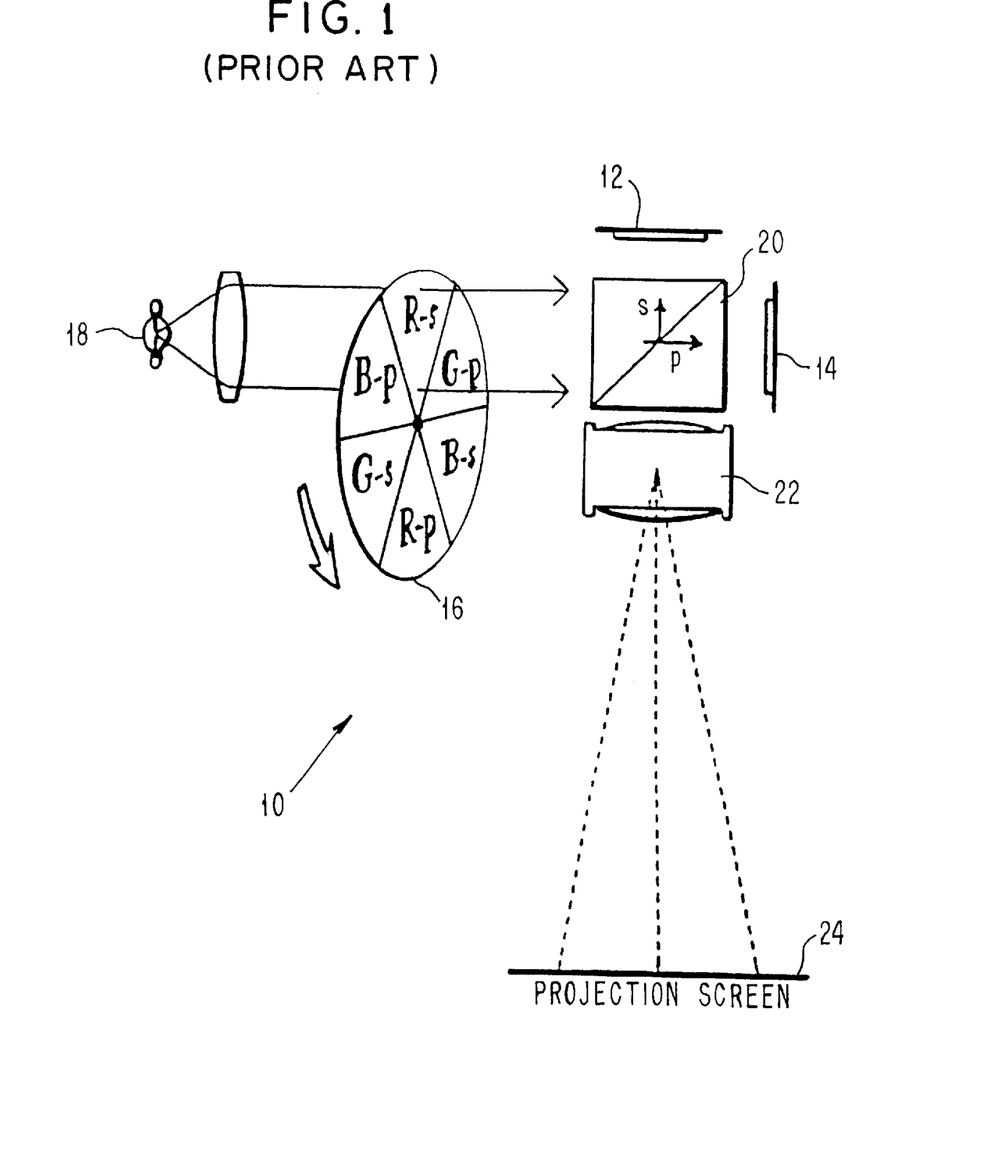
FIG. 1 shows a conventional projection display which operates in a field-sequential color mode and has two spatial light modulators (SLMs) and a color wheel.

As shown in FIG. 1, instead of a single SLM, a projection system 10 has two SLMs 12, 14 for enhancing the performance of the field-sequential color mode of operation. Such a projection display 10 using two SLMs is described in U.S. Pat. No. 5,517,340 to Doany et al., where enhancement is achieved by alternately illuminating the two SLMs 12, 14 using a color wheel 16. In this case, only one SLM is illuminated at a time. This allows a half-frame time to reset the data and the liquid crystal response, and stabilize each one of the two SLMs, thus eliminating the dead-time needed for conventional displays using a single SLM in the field-sequential color mode. Rather than operating at 180 Hz, the two SLMs operate at 90 Hz each to produce a 60 Hz combined image video rate. Each SLM still has a 50% dead time, however, the combined two SLM system 10 has no dead time, since one of the two SLMs 12, 14 is always illuminated. Although the two SLM configuration 10 eliminates the requirement of a dead-time, the spectral efficiency is still only ⅓.

As shown in FIG. 1, a light source 18 provides white light to a polarizing beam splitter (PBS) cube 20. The PBS 20 has a coating that reflects one of the linear polarizations of light, such as the s-polarization, and transmits the other polarization, e.g., the p-polarization. The PBS cube 20 illuminates the two SLMs 12, 14 with light having different polarizations. For example, the PBS cube 20 illuminates one SLM 12 with s-polarized light and illuminates the other SLM 14 with p-polarized light. The PBS cube 20 recombines images reflected from the two SLMs 12, 14, to form a color image which is projected by a projection lens 22 onto a projection screen 24.

Figure 2:
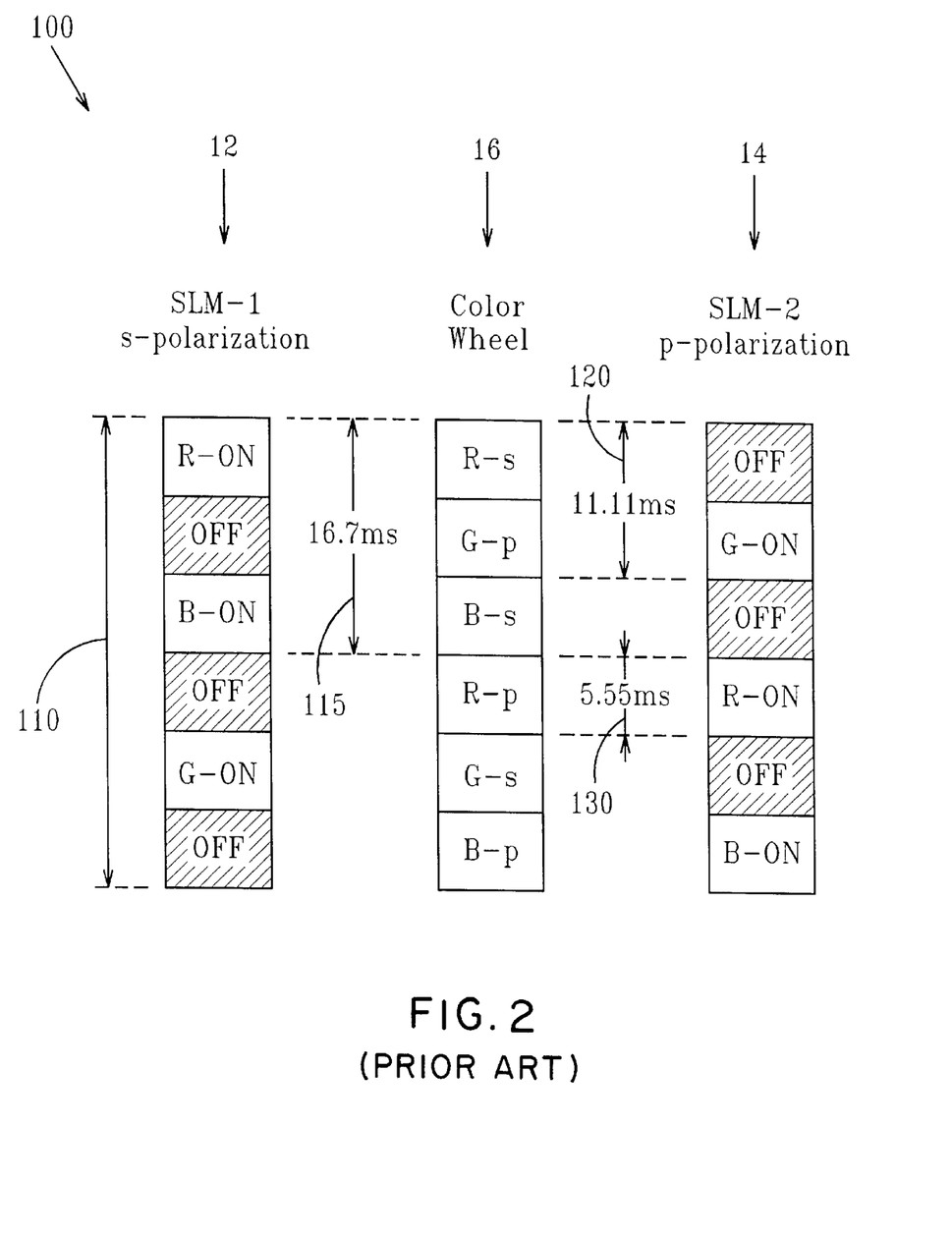
FIG. 2 shows a timing diagram of the conventional projection display shown in FIG. 1.

The two SLM projection display 10, which operates in the field-sequential color mode, has 50% duty cycle (or 50% ON-time and 50% OFF-time) for each SLM. FIG. 2 shows a timing diagram 100 of the conventional two SLM projection display 10 shown in FIG. 1. As shown in FIGS. 1 and 2, the color wheel 16 has six segments and rotates a full revolution in a time period 110 of 1/30 seconds (33.3 ms).

The six segments of the color wheel 16 include two red, green and blue (RGB) frames of alternating polarizations between successive colors, shown in FIGS. 1 and 2 as R-s, G-p, B-s, R-p, G-s and B-p, where s and p are the two linear polarizations of light, which are orthogonal to each other. The SLM 12 that receives s-polarization is shown as SLM-1 in FIG. 2, while the other SLM 14 that receives p-polarization is shown as SLM-2.

As shown in FIG. 2, the overall system cycles through an RGB frame twice in the 33.3 ms period 110, as the color wheel 16 rotates through its six segments, which correspond to two RGB frames. Thus, one full color frame is cycled every 1/60 seconds (16.67 ms), or at 60 Hz, shown as time period 115 in FIG. 2.

Instead of an 180 Hz SLM operation rate for a single SLM projector to provide a 60 Hz overall video rate, each SLM 12, 14 of the conventional two SLM projector 10 (FIG. 1) operates at only 90 Hz, despite an overall video rate of 60 Hz. Each SLM 12, 14 has a refresh cycle time 120 of 1/90 seconds (11.1 ms), and is "ON" for 1/180 (5.556 ms) and "OFF" or "dead" for 1/180 (5.556 ms), shown in FIG. 2 as reference numeral 130. The two SLMs 12, 14 operate at opposite phase relationship, where one SLM is "ON" while the other SLM is "OFF".

Under proper conditions, (e.g., a low-voltage liquid crystal material, very small liquid crystal cell gaps, and using higher operating voltages), the liquid crystal (LC) response time can be reduced below 2 ms. The time allotted by the conventional two SLM projection device 10 is much longer than 2 ms, such as the 5.356 ms period 130, shown in FIG. 2. Thus, the conventional two SLM projector 10 of FIG. 1 is inefficient as it allows more OFF time then the required 2 ms LC response time.

Further, the conventional two SLM projector 10 of FIG. 1 illuminates only one SLM at a time. Thus, an average 50% duty cycle must be maintained and cannot be exceeded, which limits the efficiency of the conventional two SLM projector. Accordingly, there is a need for a full color projection display which is highly efficient.

Moreover, the conventional two SLM projector 10 of FIG 1 has a limited contrast ratio. Improvements in the coating of the PBS cube 20 increases the contrast ratio. However, improving the contrast ratio based on improving the coating of the PBS cube 20 is difficult.

To achieve greater than 100:1 contrast ratio, the PBS coating must operate efficiently in reflecting more than 99% of the s-polarized light, while transmitting more than 99% of the p-polarized light over the entire visible spectrum, and over a reasonable range of illumination angles (e.g. ±10 degrees). The performance of currently available optical coatings is not adequate to achieve these goals. Although greater than 99% s-reflection is possible, greater than 90% p-transmission at large angles (on the order of 10 degrees) is difficult.

Typical optical systems using reflective SLMs and a PBS must include an absorbing clean-up sheet polarizer film in the reflection path of the PBS to ensure adequate contrast ratio performance. In the conventional two SLM projector 10 of FIG. 1 using the color wheel 16, both polarizations are used simultaneously. Therefore, it is not possible to include a clean-up polarizer. Accordingly, there is a need for a full color projection display with high efficiency and contrast that allows use of a clean-up polarizer, and does not require an improved PBS coating.

SUMMARY OF THE INVENTION

The object of the present invention is to provide an optical device that eliminates the problems of conventional optical systems.

Another object of the present invention is to provide an optical device having increased efficiency and contrast ratio.

Yet another object of the present invention is to provide an optical device having a reduced OFF-time for increasing the duty cycle.

These and other objects of the present invention are achieved by a display operating in a field-sequential color mode having at least two light valves which are simultaneously illuminated with different color beams having the same polarization provided from a color wheel. The light valves provide an image forming light to a projection lens for projecting the image forming light onto a screen.

The wheel has front and back surfaces which are displaced from each other and have segments of different colors for separating a polarized light into the simultaneous different color beams when the different colors of the front and back color segments overlap. When the front and back color segments overlap, then every other combined segment resulting from a combination of the front and back surface segments includes dual color bands to simultaneously provide first and second color beams for simultaneously illuminating one light valve with the first color and the other light valve with the second color.

In one embodiment, the two beams from the front and back surfaces are parallel to each other when the front and back surfaces are parallel. In another embodiment, the front and back surfaces meet to form a wedge. In this case, the two beams have different directions.

The front and back color segments are offset relative to each other and each has clear segments so that one colored beam is provided to one of the light valves. The front and back clear segments are also offset relative to each other. The wheel is rotated for sequentially illuminating the light valves with different colors simultaneously.

The display further includes a prism assembly, such as a total-internal-reflection prism, for reflecting one of the colored beams from one of the wheel's surfaces toward one of the light valves, and transmitting the other colored beams from the other wheel surface toward the other light valve. In addition, the prism assembly recombines the image forming light provided from the light valves, which may be transmissive or reflective. The prism assembly has a square or diamond cross-section and includes two triangles having a first refractive index. The two triangles are separated by a material having a second refractive index which is lower than the first refractive index. For example, the two triangles are separated by an air gap.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 3:
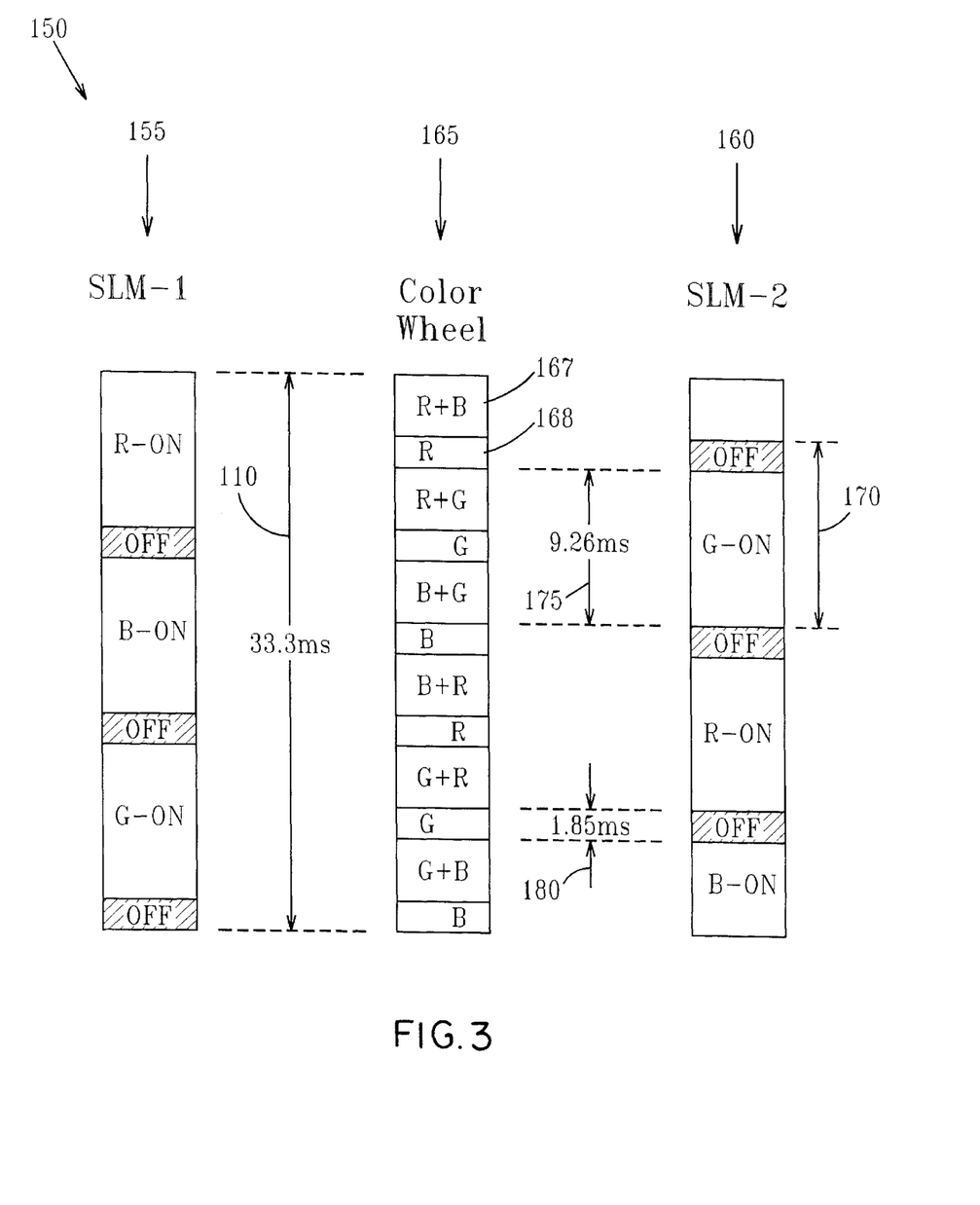
FIG. 3 shows a timing diagram of a projection display according to the present invention.

FIG. 3 shows a timing diagram 150 of a projection display according to the present invention having two spatial light modulators (SLMs) or light valves and a color wheel, and operating in the field-sequential color mode to be described in detail in connection with FIG. 7. As shown in FIG. 3, two fully shared SLMs 155, 160 are illuminated using a color wheel 165 having twelve illumination regions or segments which repeat as the color wheel 165 rotates. The repeating illumination sequence or the sequence of the twelve illumination segments of the color wheel 165 is: R+B, R, R+G, G, B+G, B, B+R, R, G+R, G, G+B, and B.

As shown in FIG. 3, the twelve illumination regions of the color wheel 165 include certain regions of dual color illumination as well as regions of a single color illumination. As seen from the illumination sequence, every other segment of the color wheel 165 includes time-overlapping color bands, or dual color bands 167. Illustratively, the dual color bands are R+B, R+G, B+G, B+R, G+R, and G+B. Thus, the color wheel 165 provides a dual color band 167 between each pair of single color bands 168. By contrast, each illumination segment of the conventional color wheel 16, shown in FIGS. 1 and 2, provides a single color output at any one time. To permit subsequent separation of the two colors in the dual color bands, the two colors selected simultaneously by the color wheel must be angularly distinct. This separation into two different color beams is required to direct each color to a different SLM.

The time-overlapping dual color bands 167 increase the duty cycle illumination onto each SLM to greater than 50% duty cycle for each SLM 155, 160. Illustratively, an image refresh rate is 60 Hz, where each RGB frame is cycled in 1/60 seconds (16.7 ms). As shown in FIG. 3, two full RGB frames are cycled in a time period 110 of 1/30 seconds (33.3 ms), and each SLM 155, 160 operates at 90 Hz, for an operating period 170 of 1/90 seconds (11.11 ms). The 11.11 ms cycle time 170 of each SLM includes an ON period 175 of 9.26 ms and an OFF period 180 of 1.85, thus resulting in a duty cycle of 83.4% (9.26/11.1=0.834).

Conventional color wheels, such as the conventional color wheel 16 shown in FIGS. 1 and 2, operate in transmission and do not permit selection of two independent colors which are directed toward different SLMs at different independent angles. To achieve the desired color control depicted in FIG. 3, where both SLMs 155, 160 are simultaneously illuminated using two different colors through the dual color bands 167, the color wheel 165 is wedged to have two non-parallel reflective surfaces, for example. Using such a reflective color wheel, both surfaces of the wheel can be used to control the output color selection.

Figure 4:
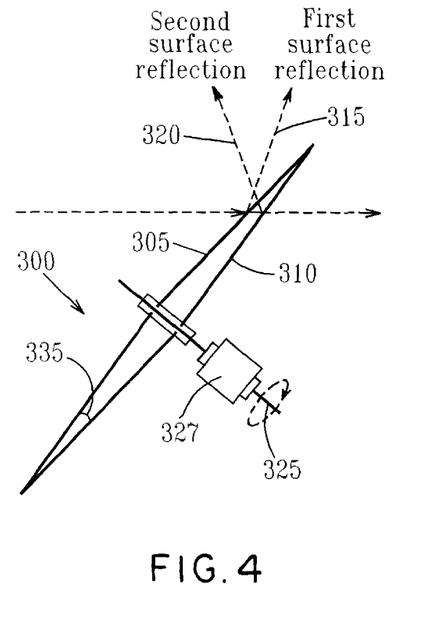
FIG. 4 shows a wedged color wheel according to the present invention.

FIG. 4 shows a preferred embodiment of a reflective color wheel 300 having two actinic surfaces 305, 310. In this embodiment, the front surface 305, which is nearest a light source, has a dichroic coating to reflect one color along a first path 315, while the rear surface 310 has a dichroic coating to reflect the second color along a second path 320. The third color is transmitted through both surfaces 305, 310 of the wheel 300, which rotates around a center axis 325 using a motor 327, for example.

Figure 5:
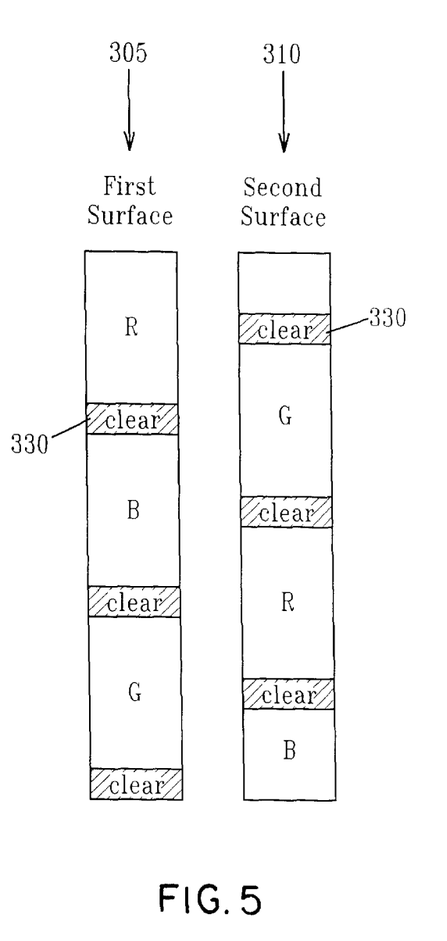
FIG. 5 shows reflectivity of front and rear surfaces of the wedged color wheel shown in FIG. 4 according to the present invention.

FIG. 5 shows reflectivity of the front and back surfaces of the 305, 310 of the color wheel 300 shown in FIG. 4. The reflectivity of first or front surface 305, provided by a dichroic coating, includes RGB sequential sections, with clear transmissive regions 330 separating the different colors. The reflectivity of second or back surface 310, provided by another dichroic coating, sequentially includes the following sections, partial B, G, R, and the remainder of B, where the different colors are separated by the clear transmissive regions 330.

In addition to the color selection property, the wheel 300 also incorporates angular control using a the two surfaces 305, 310 which are non-parallel or wedged with respect to each other to form a wedge therebetween. By having a wedge between the front and rear dichroic reflecting surfaces 305, 310, the color reflected from the front surface 305 emerges at one angle, while the color reflected from the second surface 310 emerges at a different angle. The angular separation of the two reflected beams 315, 320 is proportional to the (wedge) angle 335 between the two reflecting surfaces 305, 310. Thus, the two beams 315, 320 which are reflected simultaneously from the two wheel surfaces 305, 310 during the dual bands 167 shown in FIG. 3, have two different colors and emanate at two different angles.

Illustratively, the wedged wheel 300 is used in a projection display to be described in connection with FIG. 7, where the two reflected colors 315, 320 are used, while the third transmitted color 340 is discarded. However, since the reflective color wheel 300 separates all three colors, other optical systems ay use the transmitted color 340 along with one of the reflected colors 315, 320, for example.

The function of the color wheel 300 is to provide two simultaneous color bands at two distinct angles. It also must independently cycle through the three color bands for both outputs 315, 320. This is achieved by a front-surface reflective coating, a rear-surface reflective coating, and a wedge, or angular separation, between the two reflecting surfaces of the color wheel 300. Although FIG. 3 shows one configuration for the reflective color wheel 300, several specific configurations incorporating two reflective surfaces that are spatially separated can provide the desired function.

Figure 6:
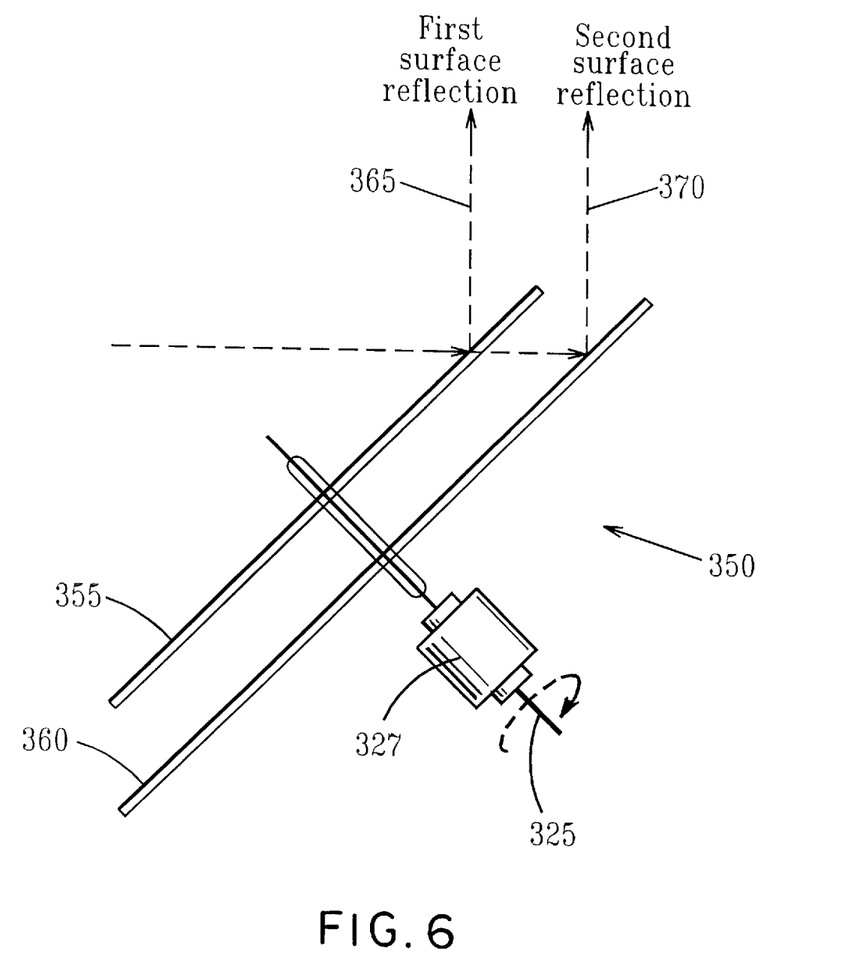
FIG. 6 shows another embodiment of a color wheel having physically separated and parallel surfaces according to the present invention.

FIG. 6 shows another embodiment 350 of a color wheel. In FIG. 6, the front and rear wheel reflective surfaces 355, 360 are physically separated and parallel to each other, for example. This physically separation provides two spatially separated reflected light beams 365, 370. Once separated, the two beams 365, 370 can be independently controlled to provide the desired angular separation.

The reflective color wheel is used in a projector using a polarized white light illumination system, such as those employing arc lamps and polarization conversion illumination optics known in the art. The polarized illumination is then directed to the color wheel. As the color wheel rotates, the light reflected off the first or front surface of the wheel cycles through the three color bands and has the same polarization as the incoming light polarization. Meanwhile, the light reflected from the second or rear surface cycles through the three color bands and is also at the same polarization. However, the lights reflected from the front and rear surfaces are separated, e.g., reflected at different angles in the case where the front and rear surfaces form a wedge.

The color selection and relative timing between the front and rear surfaces are independent, as long as the two surfaces do not select the same color at the same time. Between the reflective dichroic regions or segments of the color wheel, each surface also includes transparent regions 330 (FIG. 5). In these transparent regions 330, no light is reflected off the surfaces thus providing the necessary deadtime between two consecutive color bands. The duty cycle of the reflected light is therefore determined from the relative "ON" time of the reflective coating to the "OFF" time of the transmitting regions 330 of the wheel surface. As described in connection with FIG. 3, the duty cycle of each SLM is greater than 50%, such as 83.4%, for example.

The output of the color wheel, shown as numerals 315, 320 in FIG. 4 and numeral 365, 370 in FIG. 6, includes two independently controlled color bands physically separated from each other. In the case where the front and rear surface 315, 320 meet to form a wedge, as shown in FIG. 4, the color wheel outputs 315, 320 emerge at two distinct angles. Near the color wheel surfaces 315, 320, the two color bands are spatially coincident since both outputs 315, 320 originate from the same source and the same dual color segment 165 (FIG. 3) of the wheel, where the front and rear wheel surface segments are combined and collectively shown in FIG. 3, and separately shown in FIG. 5.

Both output colors (315, 320 of FIG. 4 and 365, 370 of FIG. 6) have the same polarizations. Having two output beams of different colors but the same polarization allows use of a total internal reflection (TIR) prism for illumination and imaging of two reflective SLMs 155, 160. The optical system eliminates the need for a PBS cube and all the contrast limitations associated with the polarizing coatings of the PBS cube.

Figure 7:
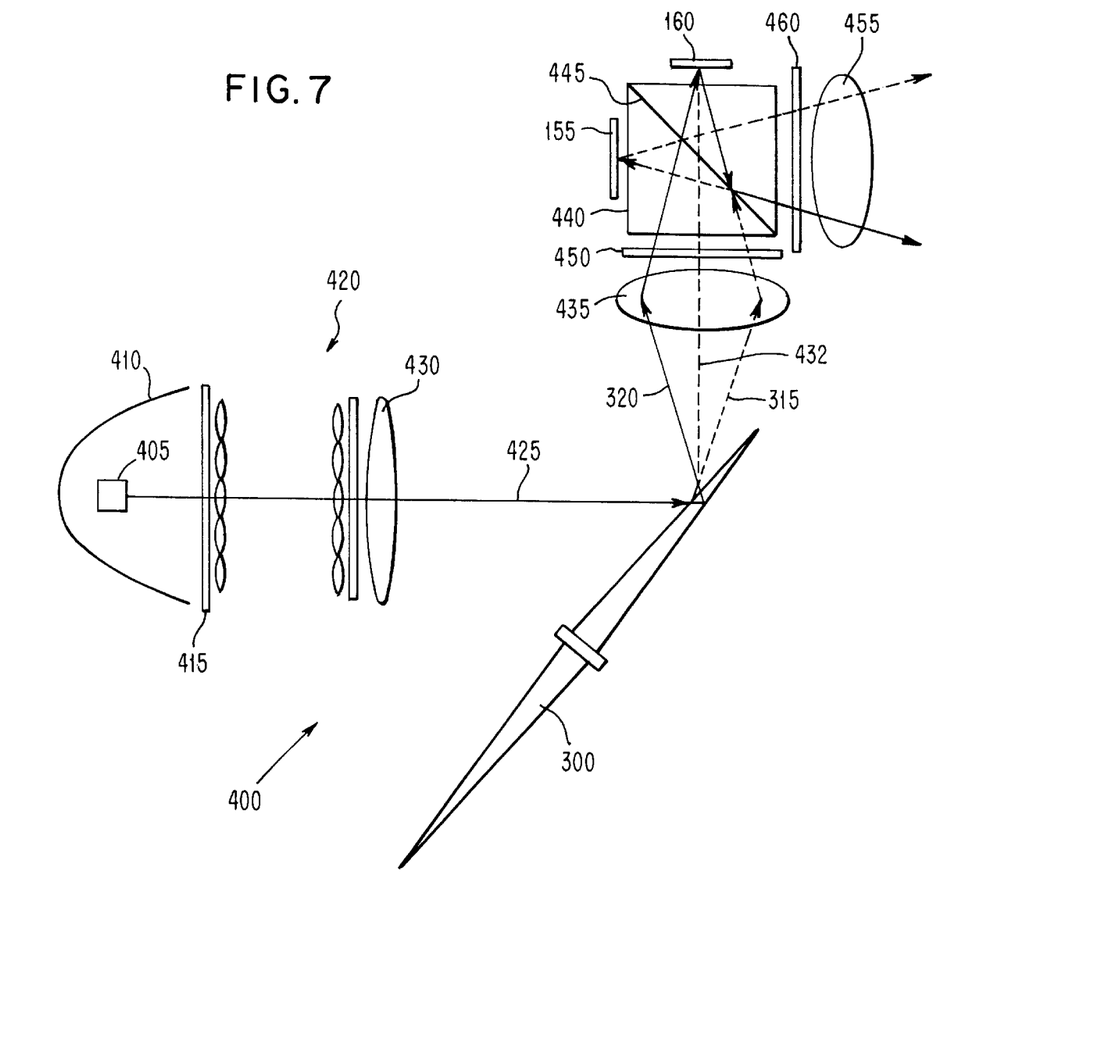
FIG. 7 shows a projection system based on reflective SLMs according to the present invention.

FIG. 7 shows a complete projection system 400 based on reflective SLMs, however transmissive SLMs may be used instead of reflective SLMs. As shown in FIG. 7, light from an arc-lamp 405 encased in a parabolic reflector 410 is first filtered to discard ultraviolet and infrared radiation using ultraviolet and infrared filter or filters, shown collectively in FIG. 7 as reference numeral 415.

The filtered light then passes through a fly's eye integrator and polarization conversion system (PCS) 420 to produce polarized light 425 of uniform intensity. The plane of uniform light intensity is imaged onto a color wheel, such as the wedged color wheel, using a condenser lens 430.

As described in connection with FIG. 4, the color wheel 300 reflects two light beams 315, 320 of different color bands at two independent angles. At least one illumination relay lens 435 is used to image the uniform illumination plane, reflected from the color wheel 300 (which illumination plane includes the two color lights 315, 320), onto the two SLMs 155, 160 through a total-internal-reflection (TIR) prism 440.

The two SLMs 155, 160 are placed near two adjacent surfaces of the TIR prism 440 such that one can be illuminated in transmission and the other in reflection off the TIR interface 445. Between the illumination relay lens 435 and the TIR prism 440, an absorbing clean-up polarizer film 450 is used to ensure polarization purity of the TIR illumination.

Illustratively, the TIR prism 440 includes two glass or transparent polymer sections or prisms separated, for example, by an air gap located between their opposing interfaces 445, also referred to as the interface of the TIR prism 440. For simplicity, the TIR interface 445 is chosen to operate at a critical angle of 45°, for example, to result in a TIR prism 440 having a square cross section. However, critical angles other than 45°, and a TIR prism having cross sections other than a square, are also suitable, as will be described in connection with FIG. 8. As is commonly used in the art, angles are defined relative to a surface normal, such as the normal to the surface of the TIR interface 445. The prism critical angle is the angle above which all incident light is reflected.

A 45° critical angle is achieved for a prism fabricated using a suitable material, such as glass or transparent polymer, having an index of refraction of about 1.41 separated by an air gap, for example. The TIR interface is the glass/air interface 445. In this configuration, light incident through the glass prism that impinges onto the TIR interface 445 at 45 degrees (relative to the normal thereto) is defined as the critical ray 432. The critical ray 432 travels along the optic axis 445 of the system. The TIR interface 445, as is well known in the art, reflects light incident thereon at angles greater than the critical ray 432. This is illustrated in FIG. 7 by a light ray 315. Conversely, light incident at angles less than the critical ray 432 (which is at the other side of the optic axis 432,) is transmitted through the TIR interface 445. The reflected light path is illustrated in FIG. 7 by a light ray 320.

As depicted in FIG. 7, the wedged reflective color wheel 300 is used to ensure that the first color beam 315 reflected by the first or front wheel surface 305 is always incident at angles greater than the critical angels, which is 45° in the illustrative example of FIG. 7. The wedged reflective color wheel 300 is also used to ensure that the second color beam 320 reflected by the second or rear wheel 310 surface is always incident at angles less than the critical angle. This optical configuration ensures that only light from the front surface 305 of the color wheel 300 reaches the one SLM 155, which is illuminated by light reflected from the TIR prism interface 445, and only light from the rear wheel surface 310 reaches the other SLM 160, which is illuminated by light transmitted through the TIR prism interface 445.

Light reflected by the SLMs 155, 160 is directed back toward the TIR interface 445, however, at complimentary angles relative to the angles of the light beams incident onto the TIR interface 445 from the wheel 300. Thus, light originally incident at the TIR interface at angles greater than 45 degrees (and therefore reflected) will now be incident at angles less than 45 degrees and will be transmitted through the prism interface 445. Similarly, light originally incident at angles less than 45 degrees (originally transmitted) will be reflected at the TIR interface 445.

As depicted in FIG. 7, this optical path directs both colors, shown as solid and dashed lines, out of the TIR prism 440 toward a projection lens 455. One color emerges to one side of the prism optic axis, while the second color emerges on the opposite side of the prism optic axis. Prior to reaching the projection lens 455, the light first passes through the analyzing polarizer 460, for example. The output analyzer 460 is oriented perpendicular to the input polarizer 450. The input and output polarizers 450, 460 remove unwanted polarization and improve contrast.

In one embodiment, the direction of polarization of the input polarizer 450 is perpendicular to the direction of polarization the output polarizer or analyzer 460. In this case, the output analyzer 460 transmits (i.e., bright state) only the image forming light which has been rotated by the SLMs in a manner known in the art, and absorbs (i.e., dark state) any non-rotated light.

Alternatively, in another embodiment, the direction of polarization of the input polarizer 450 is parallel to the direction of polarization the output polarizer 460. In this case, the output analyzer 460 transmits (i.e., bright state) only the image forming light which has been not been rotated by the SLMs, and absorbs (i.e., dark state) any rotated light.

Although FIG. 7 depicts a TIR prism operating at 45 degrees using an air gap and glass prisms having a refractive index of 1.41, different glass or other transparent material having any value for its refractive index can be used. In this case, the critical angle, above which all incident light is reflected, is not 45 degrees.

Figure 8:
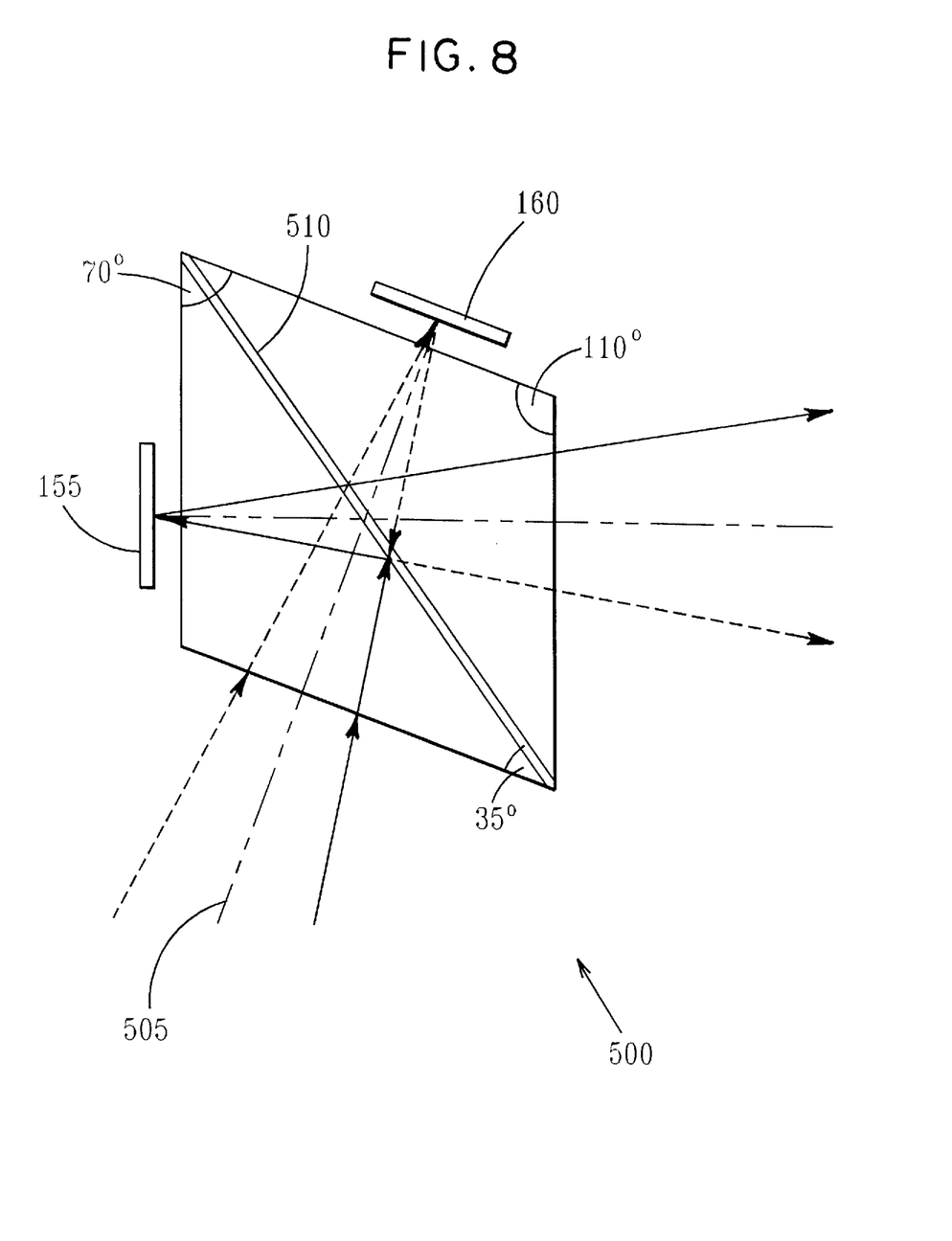
FIG. 8 shows a total internal reflection prism assembly having a 35° critical angle according to the present invention.

FIG. 8 depicts a TIR prism assembly 500 operating at a critical angle of 35 degrees. As defined previously, the 35 degree critical angle is the angle between the TIR surface normal and the optical axis 505. In this case, the cross-sectional shape of the prism assembly 500 is diamond-shaped rather than the square shape of the prism 440 shown in FIG. 7. Illustratively, a critical angle of 35 degrees is obtained using a glass-air interface with a glass index of about 1.74. As shown in FIG. 8, the center line or optic axis 505 of the illumination beam is skewed at 20 degrees compared to the optic axis 432 shown in FIG. 5. Thus, the sides of the diamond-shaped prism 500 are skewed by 20° relative to the square prism 440 of FIG. 7. In particular, instead of having the four 90° angles of the square prism 440 (FIG. 7), the diamond-shaped prism 500 has two diagonally opposite acute angles of 70° and two diagonally obtuse opposite angles of 110°.

Both TIR prism configurations of FIGS. 7 and 8 operate using a glass-air interface, shown as numeral 445 in FIG. 7 and number 510 in FIG. 8. It is also possible to use the TIR effect at an interface of high index material and low index material.

Figure 9:
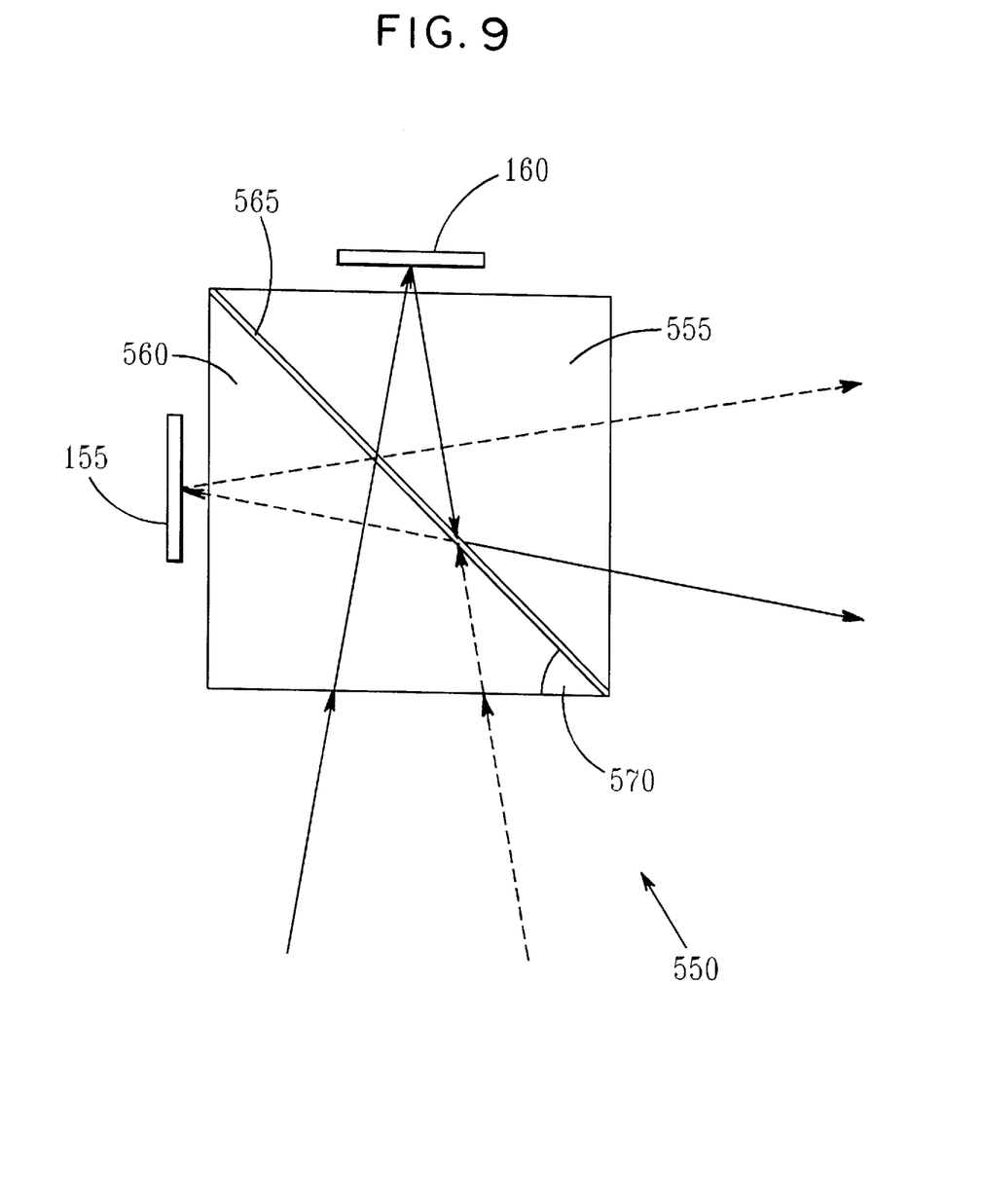
FIG. 9 shows a total internal reflection prism assembly having a 45° critical angle according to the present invention.

FIG. 9 depicts a TIR prism 550 using two sections 555, 560 of a high index glass that can still operate at 45 degrees. The 45-degree critical angle is obtained using a low index film 560 between the two halves 555, 560 of the TIR prism assembly 550, instead of having an air gap therebetween. For example, using the low index optical material 565, such as magnesium fluoride having an index of refraction of n=1.38, as the interface material between two prism sections 555, 560 having an index of about 1.95, maintains the 45-degree critical angle 570.

Returning to FIG. 7, consequences of the above described optical configurations is that only one-half pupil of the projection lens 455 is used to image the first SLM 155, and the other half is used to image the second SLM 160. This implies that the numerical aperture (NA) of the projection lens 455 must be greater than the NA of the illumination relay lens 435. To maximize the illumination throughput, the illumination NA can be made asymmetric.

The TIR effect that reflects light having a positive angle (which is greater than the critical angle,) and transmits light having a negative angle (which is less than the critical angle,) as described in connection with FIG. 7, is applicable only to variations in angles of incidence in one input plane, referred to the parallel plane, which is the plane of the paper in FIG. 7. There is no effect to changing the incidence angle in the perpendicular plane normal to the parallel plane. Thus for a 0.3 NA projection lens 455 having a full angular acceptance range of almost 35° (±17.5°), the illumination source can be tailored to provide approximately 17° angular range in one dimension while maintaining the full 35° in the opposite dimension. The simple imaging optical path (which includes only the TIR prism 440 and analyzing polarizer film 460) facilitates the use of higher NA projection lenses.

An asymmetric NA in the illumination is produced by the use of anamorphic optics in the illumination optical system. For example, in the fly's eye integrator 420, the aspect ratio of the lens elements can be modified by doubling the length of one side and an anamorphic condenser can be used to produce the proper aspect ratio illumination with one dimension at twice the angular range of the other dimension. Alternatively, rather than an anamorphic condenser lens, an anamorphic illumination relay lens can also be used, or both the condenser and the relay lens may be anamorphic.

Additional performance enhancements concepts can also be incorporated in the present optical system. For example, depolarization of the illumination results from the compound angle reflection at the TIR interface. This reduces the contrast ratio of the projector 400. However, incorporation of an optical retardation film near the SLMs 155, 160 can produce a cancellation of the depolarization in the reflected light.

The analyzing polarizer 460 must absorb all the dark state light. In order to avoid overheating in the polarizer 460, a fan can be used to provide air flow to cool this polarizer 460. Alternatively, a polarizing beam splitter (PBS) cube can be added between the analyzing film polarizer 460 and the TIR prism 440. The PBS will reflect most of the dark state polarization thus greatly reducing the amount of light that will be absorbed by the polarizer film 460.

The projection device according to the invention is a high efficiency two SLM projector operating in a field-sequential color mode using polarization-based reflective SLMs. The efficiency gain is a result of simultaneous illumination of both SLMs using two different colors allowing both SLMs to operate at greater than 50% duty cycle. Each SLM cycles sequentially through the three primary colors, RGB.

The ability to efficiently illuminate two SLMs at two different colors, as well as maintain the sequential color illumination, is achieved by the use of the reflective color wheel which can select any two colors simultaneously. Both surfaces of the color wheel posses a reflective coating, with the front surface selecting the first color and the rear surface selecting the second color.

In one embodiment, the two surfaces of the color wheel are wedged relative to one another thus allowing angular separation of the two selected colors. A prism with an air gap, for example, is used to selectively direct each of the two colors to the appropriate SLM. Operation of the prism is based on total internal reflection (TIR) at the air-gap interfaces. The prism also is used to recombine the image forming light from the two SLMs. Both SLMs are illuminated using the same polarization. An analyzing polarizer is placed at the exit of the TIR prism.

As described, the inventive projection device employs several concepts. For example, first, a dual-surface color wheel operating in reflection is used to simultaneously provide two independent colors; the first surface provides one color while the second surface provides the second color. Second, each of the two color outputs cycles through the three primary colors RGB as the wheel rotates. Third, the duty cycle (relative ON time) of each color is independently controlled by each surface allowing greater than 50% duty cycle illumination. Fourth, the relative phase (ON:OFF timing relationship) of the two colors is controlled independently on each surface by controlling the reflective/transmissive areas on the two surfaces. Fifth, the two actinic surfaces of the color wheel are wedged, or angularly separated, to provide a distinct angular separation between the two output colors. Sixth, a prism employing the optical effect of total-internal-reflection (TIR) is used to separate the two colors in order to simultaneously illuminate two SLMs. The TIR prism also recombines the image forming light reflected by the two SLMs and directs it to the projection lens.

The projection display according to the present invention can simultaneously illuminates at least two SLMs. The simultaneous illumination allows SLMs to operate at substantially greater than 50% duty cycle, thus substantially increasing the efficiency of the display.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A display comprising:
    a light source for providing polarized light;
    a wheel having front and back surfaces displaced from each other, said front and back surfaces each having segments of different colors for separating the polarized light into a plurality of colors having the same polarization;
    at least two light valves each receiving different ones of said plurality of colors and providing an image forming light; and
    a projection lens for projecting the image forming light onto a screen.

2. The display of claim 1, wherein said segments of said front surface are offset relative to said segments of said back surface so that every other combined segment resulting from a combination of said segments of said front and back surfaces includes dual color bands to simultaneously provide first and second colors for illuminating one of said at least two light valves with the first color and another of said at least two light valves with the second color.

3. The display of claim 1, wherein said segments of said front and back surfaces simultaneously reflect the plurality of colors toward said at least two light valves.

4. The display of claim 1, wherein said segments of said front and back surfaces are separated by transparent regions, said transparent regions of said front surface being offset relative said transparent regions of said back surface.

5. The display of claim 1, wherein said segments of said front and back surfaces are separated by transparent regions which are offset from each other so that one colored beam is provided to one of said at Least two light valves.

6. The display of claim 1, wherein said front and back surfaces are actinic surfaces and said segments have reflective dichroic coatings.

7. The display of claim 1, wherein said segments of said front and back surfaces are separated by off regions for preventing illumination of said at least two light valves, wherein a duty cycle of each of said at least two light valves is greater than 50%.

8. The display of claim 1, further comprising a device to rotate said wheel for sequentially illuminating said at least two light valves with different colors simultaneously.

9. The display of claim 1, further comprising a prism assembly for directing the plurality of colors to said at least two light valves and directing the image forming light to said projection lens.

10. The display of claim 9, wherein a cross-section of said prism assembly is one of a square and a diamond.

11. The display of claim 9, wherein said prism assembly includes two triangles separated by an air gap.

12. The display of claim 9, wherein said prism assembly includes two triangles of a first material having a first index of refraction, said two triangles being separated by a second material having a second index of refraction.

13. The display of claim 12, wherein said first material is larger than said second index of refraction.

14. The display of claim 9, wherein said at least two light valves are located on adjacent sides of said prism assembly.

15. The display of claim 1, further comprising a total-internal-reflection prism for reflecting the plurality of colors to one of said at least two light valves, transmitting the plurality of colors to another of said at least two light valves, and recombining the image forming light provided from said at least two light valves.

16. The display of claim 1, wherein said at least two light valves are one of transmissive and reflective light valves.

17. The display of claim 1, further comprising a polarizer located between said wheel and said at least two light valves.

18. The display of claim 1, further comprising a polarizer located between said at least two light valves and said projection lens.

19. The display of claim 1, further comprising an input polarizer located between said wheel and said at least two light valves and an output polarizer located between said at least two light valves and said projection lens.

20. The display of claim 19, wherein a direction of polarization of said input polarizer is perpendicular to a direction of polarization said output polarizer.

21. The display of claim 19, wherein a direction of polarization of said input polarizer is parallel to a direction of polarization said output polarizer.

22. The display of claim 19, wherein said input polarizer is perpendicular to said output polarizer.

23. The display of claim 1, further comprising an illumination relay lens located between said wheel and said at least two light valves.

24. The display of claim 1, wherein said front and back surfaces are separated from each other to simultaneously reflect a first color beam of said plurality of colors from said front surface and a second color beam from said back surface, said first color beam being parallel to said second color beam.

25. The display of claim 1, wherein said front and back surfaces meet to form a wedge to simultaneously reflect a first color beam of said plurality of colors from said front surface along a first direction and a second color beam from said back surface along a second direction.

26. A color wheel for field-sequential color projection comprising:
- a first surface having first color segments separated by first transparent segments, said first color segments converting a white light to different colors; and
- a second surface having second color segments separated by second transparent segments, said second color segments converting said white light to said different colors;
- said first color segments being offset from said second color segments to simultaneously provide two beams of light having different colors when said first and second color segments overlap, and said first transparent segments being offset from said second transparent segments to transmit said white light.

27. The color wheel of claim 26, wherein said first and second color segments include reflective coatings.

28. The color wheel of claim 26, wherein said two beams of light have an identical polarization.

* * * * *